Aug. 9, 1955 S. B. WEINER 2,715,162

AUTOMATIC ROUTINE APPARATUS

Filed Sept. 21, 1954 8 Sheets-Sheet 1

Aug. 9, 1955 S. B. WEINER 2,715,162

AUTOMATIC ROUTINE APPARATUS

Filed Sept. 21, 1954 8 Sheets-Sheet 2

Aug. 9, 1955 S. B. WEINER 2,715,162

AUTOMATIC ROUTINE APPARATUS

Filed Sept. 21, 1954 8 Sheets-Sheet 3

Aug. 9, 1955 S. B. WEINER 2,715,162

AUTOMATIC ROUTINE APPARATUS

Filed Sept. 21, 1954 8 Sheets-Sheet 4

Aug. 9, 1955 S. B. WEINER 2,715,162

AUTOMATIC ROUTINE APPARATUS

Filed Sept. 21, 1954 8 Sheets-Sheet 6

2,715,162

AUTOMATIC ROUTINE APPARATUS

Sherman B. Weiner, Rochester, N. Y., assignor to Stromberg-Carlson Company, a corporation of New York Application September 21, 1954, Serial No. 457,389

17 Claims. (Cl. 179—175.2)

Figures 1, 9:
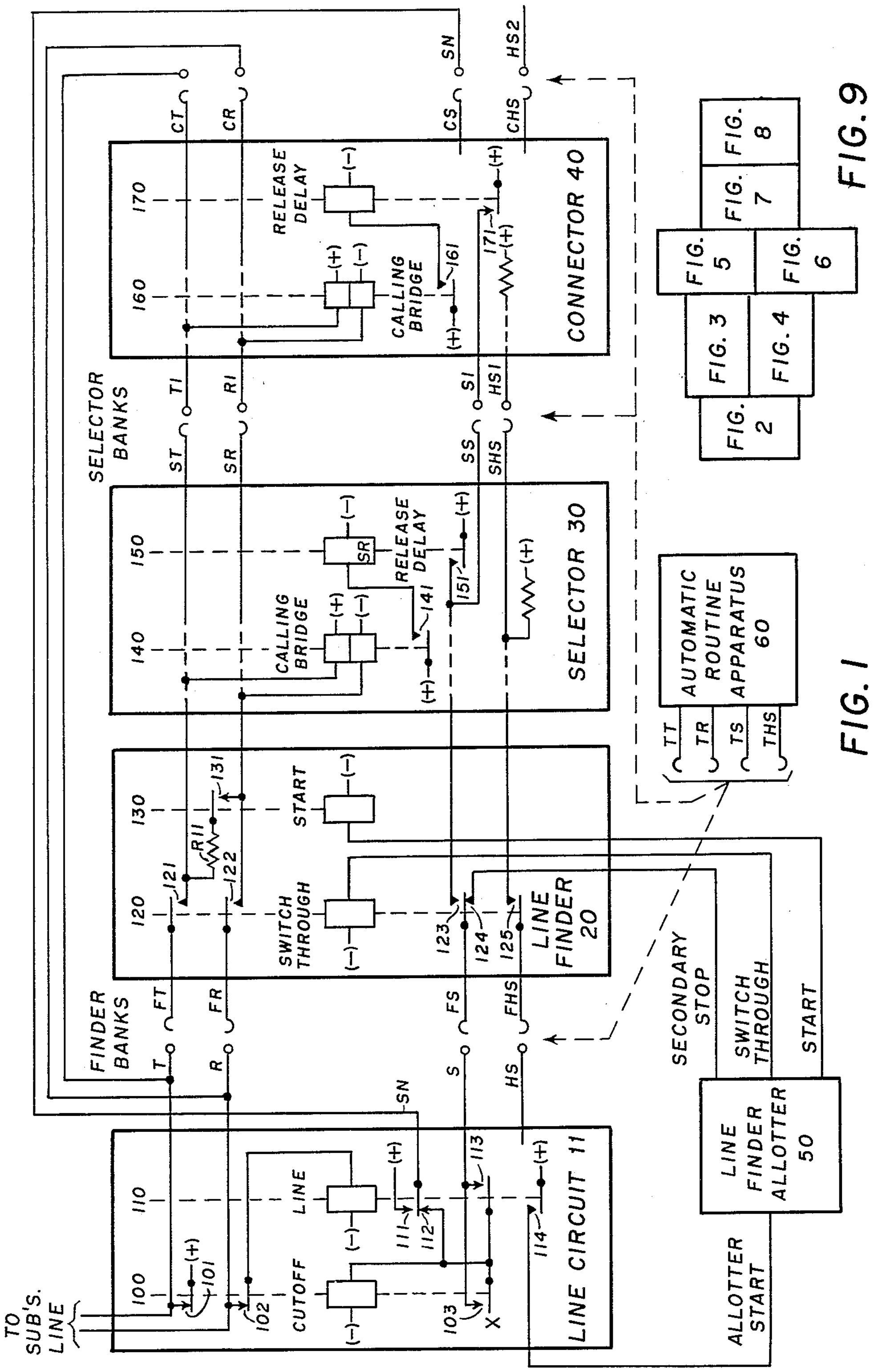

This invention relates to automatic telephone systems and more particularly to automatic routine test apparatus for use in automatic telephone systems.

A telephone exchange contains many groups of different types of circuits. At the time of installation of the exchange, cable connections are made to interconnect the various groups of circuits. Before the exchange is placed in service, it is necessary to test the cable connections for continuity and to check against crosses or stray potentials on the individual cable conductors.

To illustrate the magnitude of the testing required, consider a 1,000 line step-by-step exchange. In an exchange of this size the line circuits would probably be divided into ten groups of 100 lines each, thus necessitating the use of ten groups of line finders, ten groups of selectors, and ten groups of connectors. Cable connections are made between the individual line circuits of a group and the finder banks serving that group, between the line finders and their individually associated selector circuits, between the selector banks of each group and each connector circuit in all ten groups of connector circuits, and between the connector banks in each group to the individual line circuits served by that group of connectors.

It has been the practice, prior to this invention, to do the major part of the testing by manual means. The usual practice in testing the cable connections between the line circuits and the finder banks, and between the line finders and selectors, is for the installer to connect a clip ended telephone instrument to the talking conductors, of a line circuit to be tested, either at the distributing frame or at the terminal block associated with the line finder banks. He then initiates a sufficient number of calls from that line circuit to enable each finder in the finder group to connect with that particular line circuit by way of the finder banks. A voltmeter is usually connected in parallel with the clip ended telephone instrument to check against reversals on the talking conductors. After the line finder switches through, the calling bridge relay of the associated selector circuit furnishes the potential for a voltage reading. This particular test is repeated on each line circuit in the exchange.

The cable connections between the selector banks and the connector circuits are usually tested by means of a semi-automatic test box which is connected by plug ended cords to the monitor and test jacks associated with the individual selector circuits. The installer controls the selector, by means of a dial associated with the test box, to step to the first level in its banks and thus switch through to the first set of terminals in the first level since the selectors are arranged to hunt for idle terminals in a selected level. The test box then tests the continuity and condition of the conductors extending from the first set of terminals to a connector circuit. By suitable manual manipulations of the selector circuit relays, the installer then advances the selector to the second set of terminals and the switch box repeats the test on that set of terminals. This series of tests is repeated for each terminal in each level of the selector banks.

The connector banks multiple is usually tested by means of the above-mentioned test box. A first installer controls the connector circuit by means of the test box dial to select each line circuit connected to the connector banks in turn. A second installer either moves a test phone from one line circuit terminal to the next to test ringing, or observes the operation of the line circuits.

It is believed apparent from the above that the testing involved in readying an exchange for service is a tedious and time consuming operation.

Accordingly, it is the general object of this invention to provide new and improved testing apparatus for use in an automatic telephone system.

It is a more specific object of this invention to provide automatic routine apparatus for performing tests in an automatic telephone system.

Briefly, the invention accomplishes the above cited objects by providing a portable automatic routine apparatus which is adapted to connect with the bank multiple terminals of line finders, selectors, and connectors. In step-by-step systems, the various bank multiples are wired for access by more switches than are equipped so that if future trunking increases, switches may be added readily. The switch associated with the test box is plugged into any one of these unequipped positions.

The cable connections between the line circuits and the finder banks, and between the line finders and the selectors, are tested by associating the automatic routine apparatus with the line finder banks. The automatic routine apparatus first tests the line circuit associated with any particular set of terminals and then causes a line finder to connect with that particular set of terminals. When the line finder switches through to its associated selector circuit, the continuity test and check for crosses and stray potentials is made on the conductors extended to the associated selector circuit through the line finder circuit. If the tests are successful, the automatic routine apparatus steps the wipers of its associated switch into engagement with the next set of terminals and thus repeats the test on all line circuits associated with the finder banks. The installer is instructed to busy out all finders except one and thus test each line circuit with that particular finder, and then repeat the test with each finder of the group in turn, if time permits. Otherwise, the finders of the group are utilized in rotative order to connect with successive line circuits under test. The automatic routine apparatus is arranged to automatically arrest its operation if a fault is encountered and to energize audible and visual means to call the installer and indicate the particular fault found, respectively.

The automatic routine apparatus tests all 100 terminals of the finder bank and then energizes the audible means to inform the installer that the tests are complete.

The connections between the selector banks and the connector circuits are tested by associating the automatic routine apparatus with the selector banks multiple. The automatic routine apparatus tests the conductors associated with one set of terminals and then automatically steps into engagement with the succeeding set of terminals and repeats the test until all of the sets of terminals in the selector banks have been tested.

The connections between the connector banks multiple and the line circuits are tested by associating the automatic routine apparatus with the connector banks multiple. The automatic routine apparatus first tests the line circuit associated with any particular set of terminals and then causes a line finder to connect with that particular line circuit. The automatic routine apparatus then makes a further test to make certain that the connector banks terminal is made busy when a line finder selector is attached to the associated line circuit. These tests are repeated on each line circuit terminating in the connector banks.

Further objects and advantages of the invention will be apparent as the following description proceeds and the features of novelty which characterize the invention will be pointed out in particularity in the claims annexed to and forming a part of this specification.

For a better understanding of the invention, reference may be had to the accompanying drawings which consist of nine figures on eight sheets.

Fig. 1 shows the trunking diagram of the described automatic telephone system in block and fragmentary form.

Figs. 2–8, inclusive, show the automatic routine apparatus in detailed form.

Fig. 9 shows the recommended arrangement of the drawings to show the invention.

The general operation of the disclosed step-by-step system can best be understood by reference to the trunking diagram of Fig. 1. The local subscriber associated with line circuit 11 initiates a call by seizing line circuit 11. Line circuit 11 initiates the operation of line finder allotter 50 to cause a preselected line finder, such as line finder 20, to connect with the line circuit terminals in the finder bank. Line finder 20 seizes its individually associated selector circuit, such as selector 30, during the line finding operation.

The calling subscriber then dials a digit into selector 30 to cause said selector to search for and connect with an idle connector, such as connector 40, in the selected level. The calling subscriber then dials the remaining digits of the desired called line to cause connector 40 to connect its wipers with the set of terminals in its banks corresponding to the called subscriber's line circuit.

Figure 2:
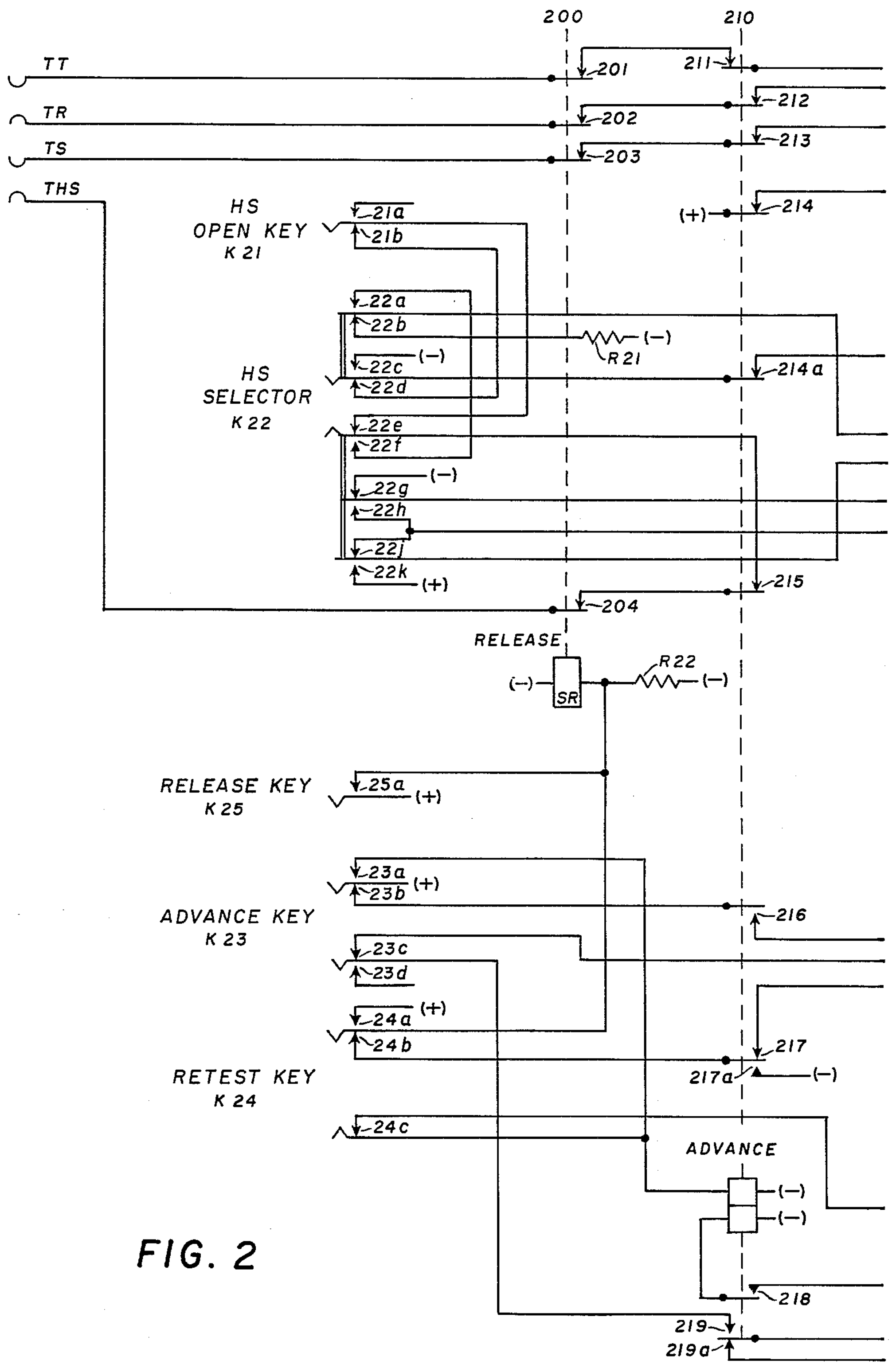
Figure 3:
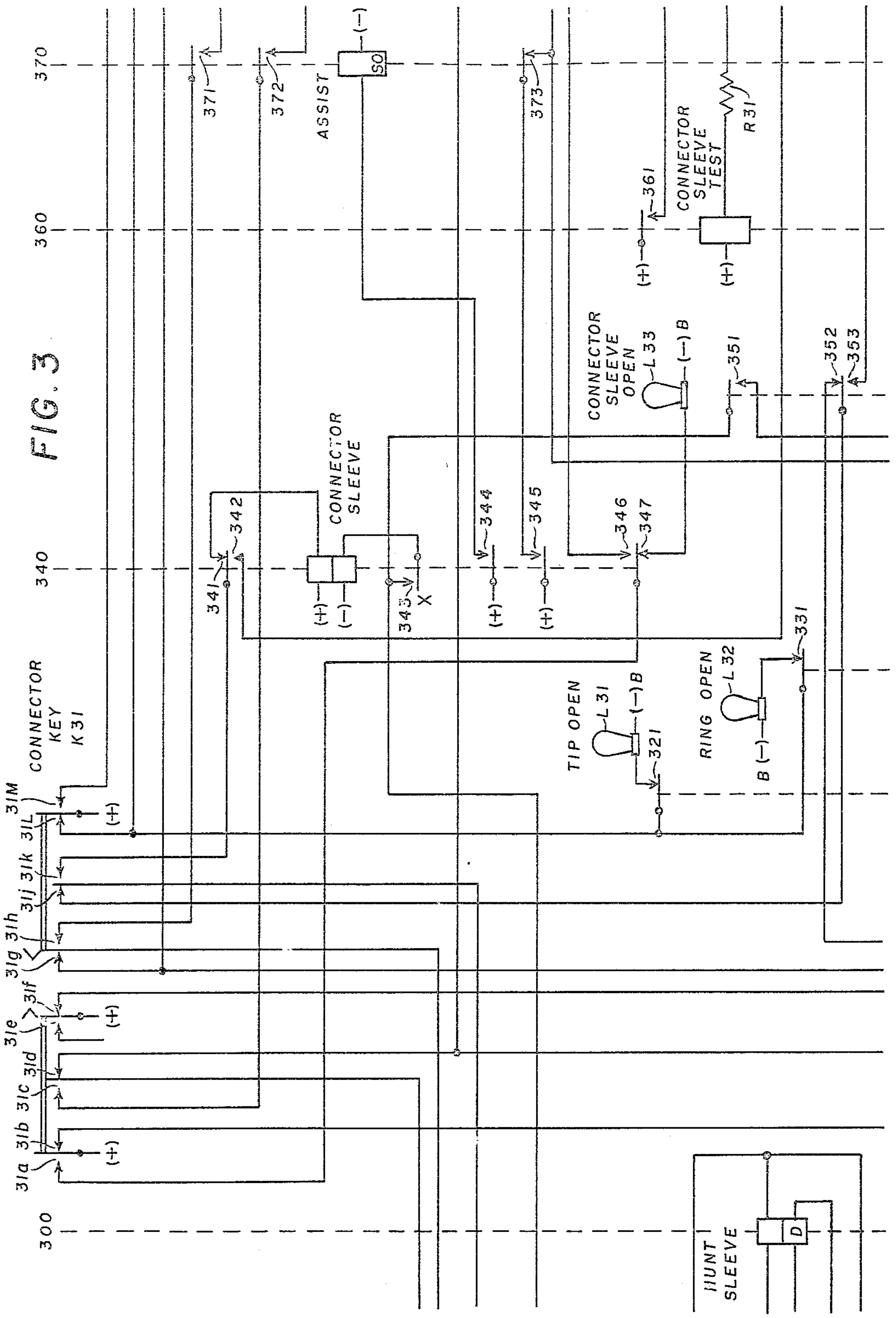
Figure 4:
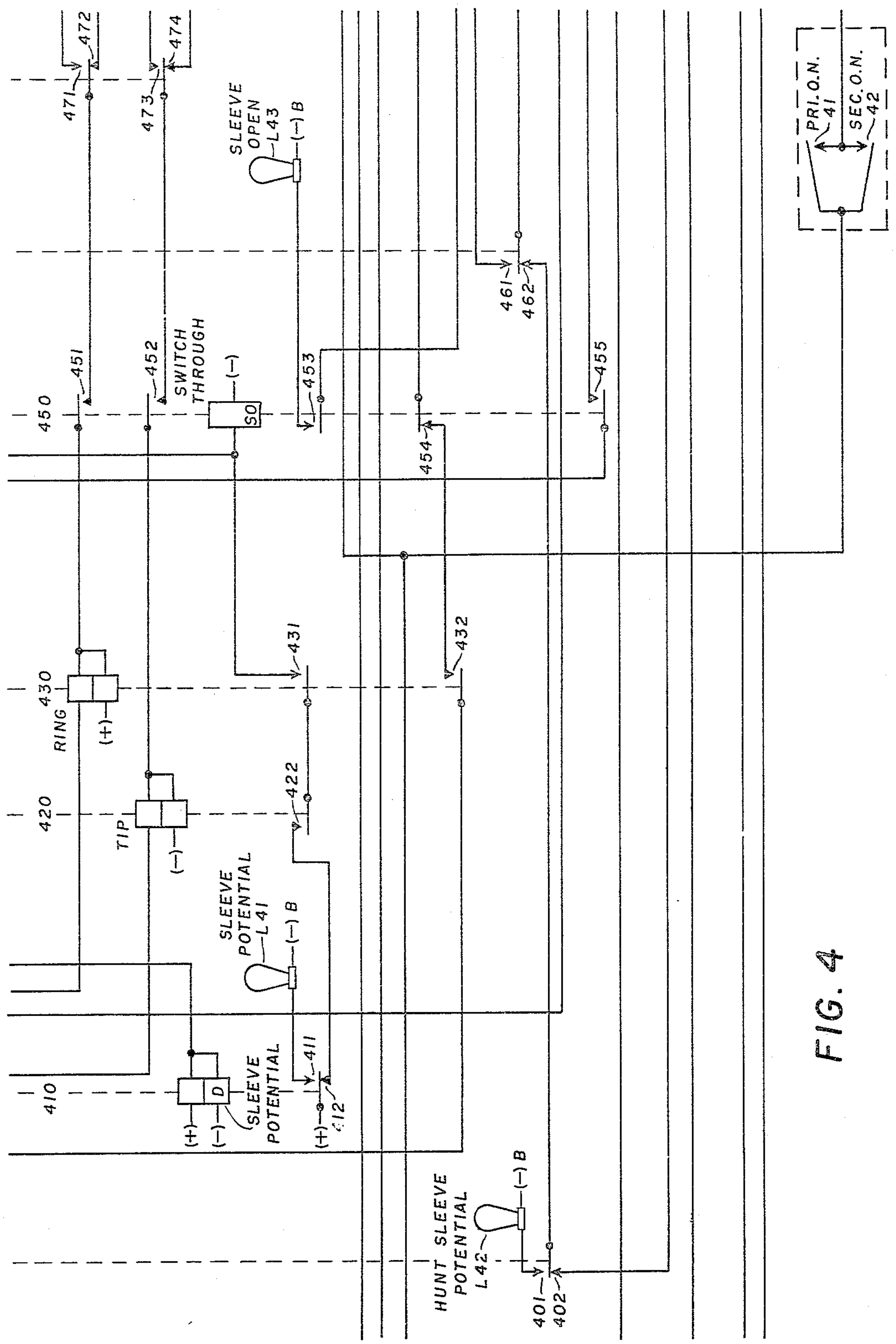
Figure 5:
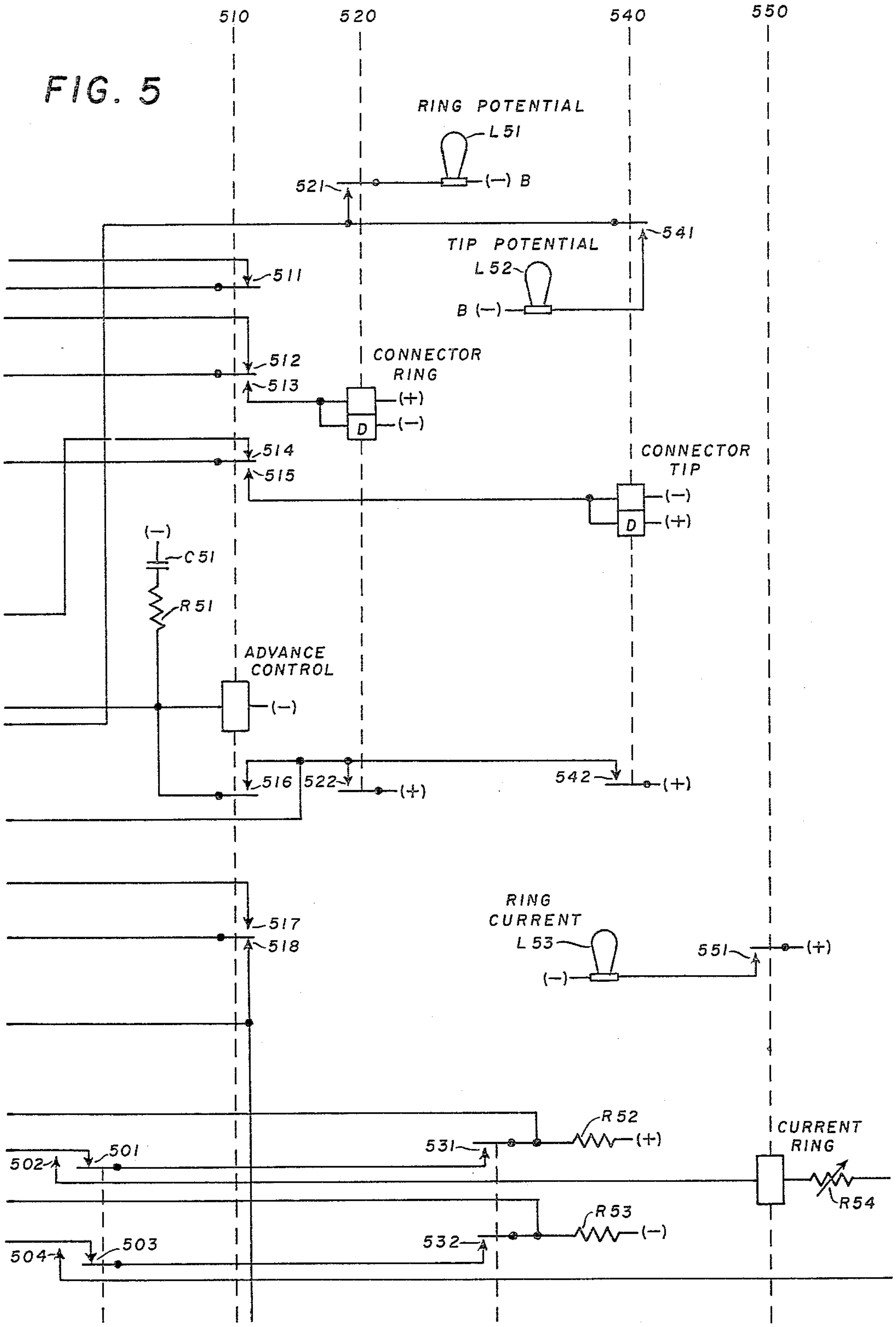
Figure 6:
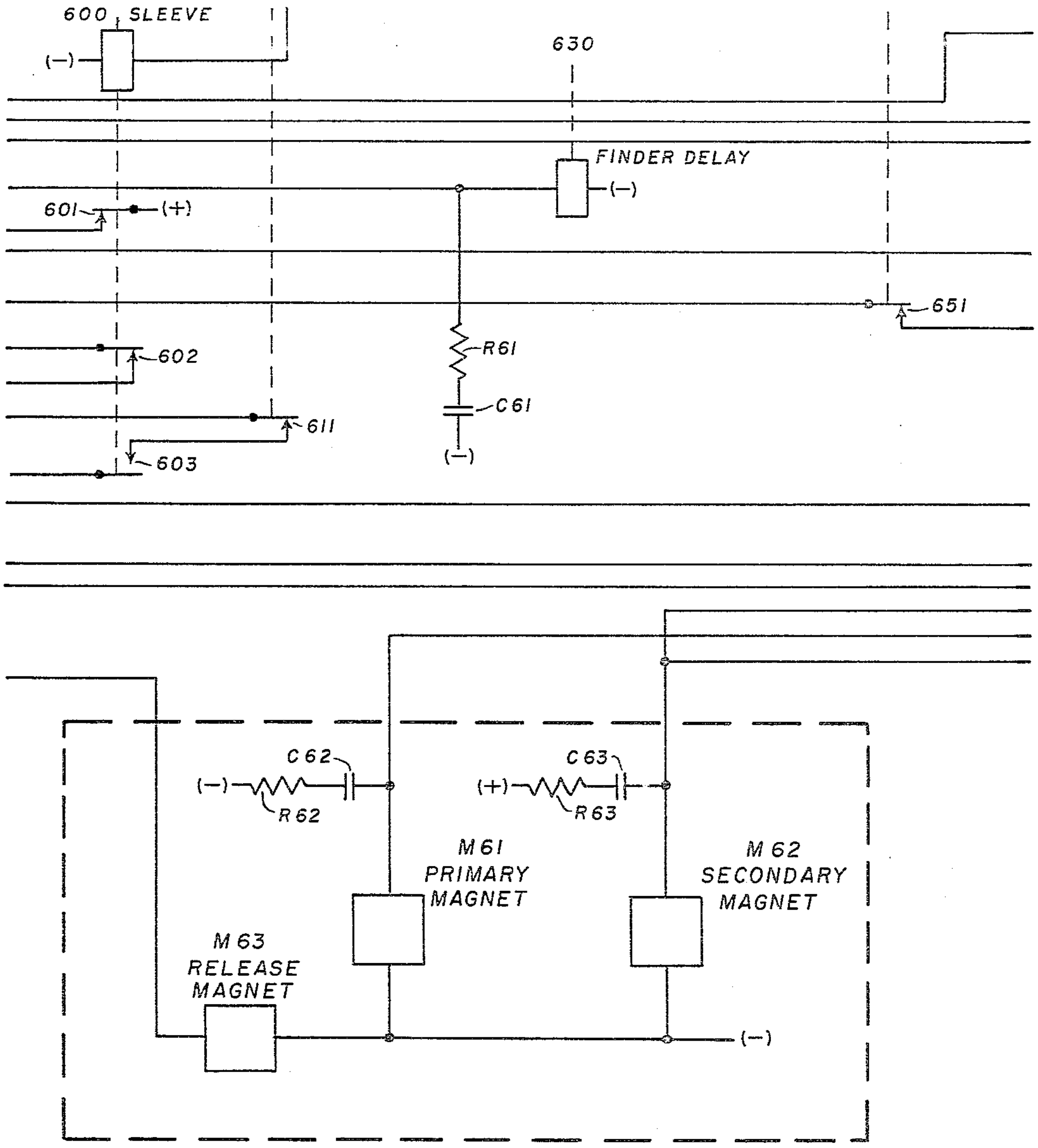

The automatic routine apparatus 60 is designed to connect with the terminals of the finder banks (T, R, S, and HS), the terminals of the selector banks (T1, R1, S1, and HS1), and the terminals of the connector banks (T, R, SN, and HS2), which are shown in Fig. 2.

In the drawings and description, the exchange battery is shown as plus (+) and minus (−) and described as ground and battery, respectively. It is to be understood that in this system the positive terminal of the battery is grounded and is, therefore, referred to as ground. The negative terminal of the battery is referred to as battery.

A detailed description of the system follows.

*Finder bank multiple test*

Preparatory to making a test on the finder bank multiple, the operator plugs the switch associated with the automatic routine apparatus into an unequipped finder switch position in the line finder group. In the disclosed arrangement, the selector circuits, such as selector circuit 30 of Fig. 1, have a resistance ground normally connected to the hunt sleeve conductor HS. With selector circuits of this type, it is necessary to operate the HS selector key K22 in Fig. 2 before initiating the test.

Figure 7:
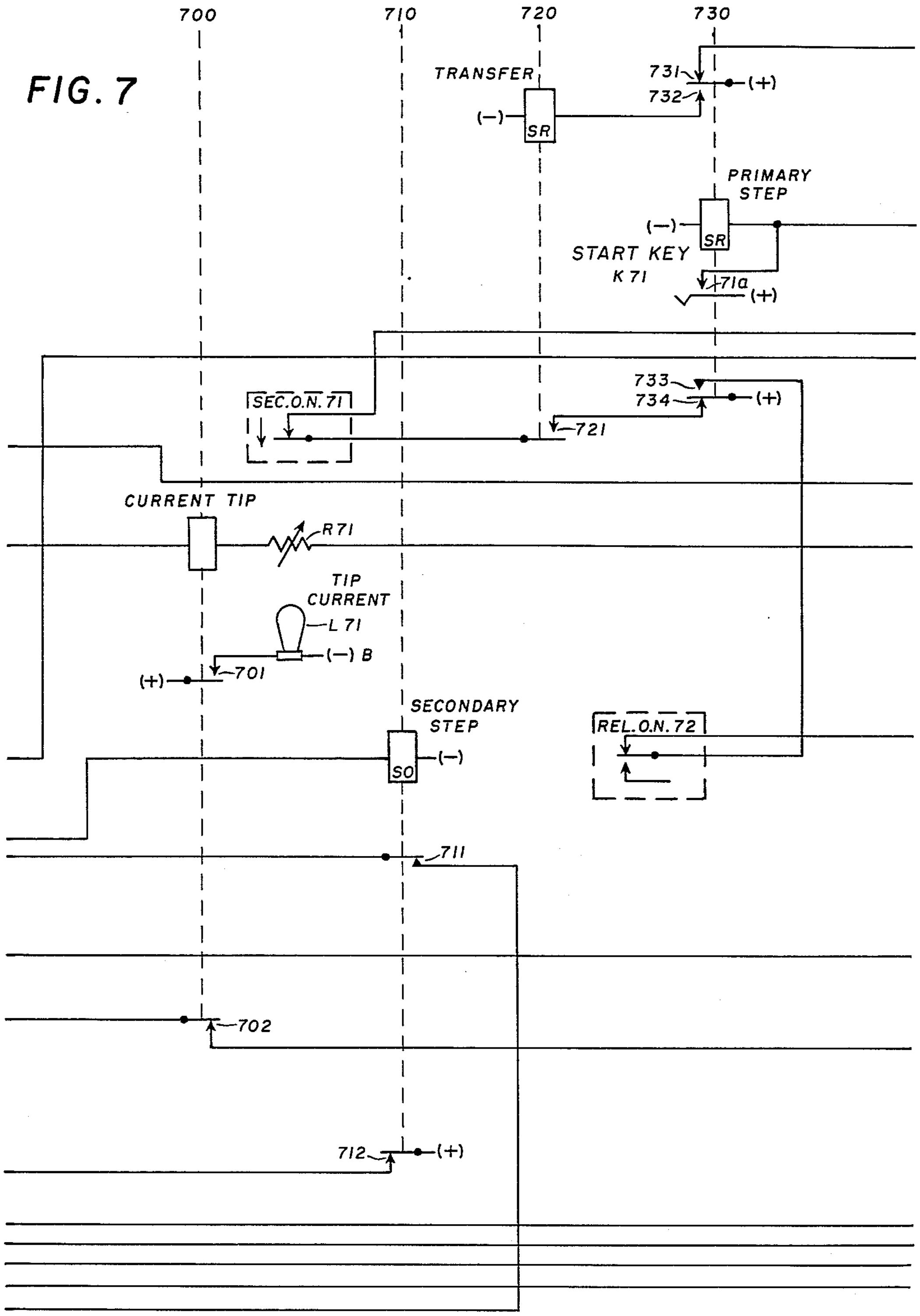
Figure 8:
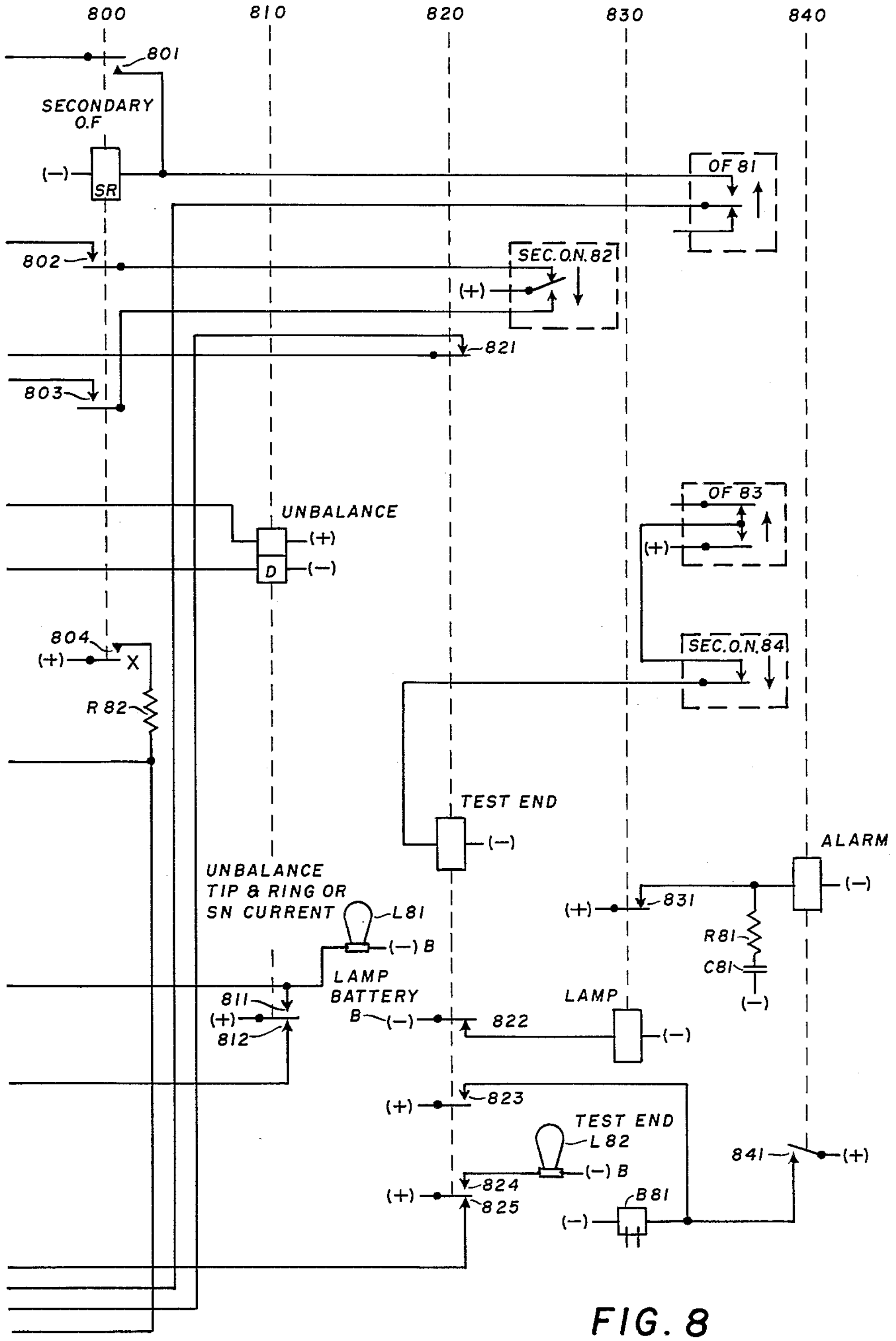

To initiate the test of the finder multiple, the operator depresses the non-locking start key K71 of Fig. 7. Primary step relay 730 operates from ground through operated contacts 71*a* of key K71 and through its winding to battery. At its operated contacts 732, relay 730 closes an operating circuit for transfer relay 720. At its operated make contacts 733, relay 730 connects ground through unoperated break contacts of the release off-normal spring pile-up 72 and through the winding of primary magnet M61 to battery. The operation of the primary magnet M61 serves to step the switch one step in its primary direction.

When the operator releases start key K71, relay 730 releases to thereby deenergize the primary magnet M61 at contacts 733. At its now normal break contacts 734, relay 730 closes ground through operated make contacts 721 on relay 720, break contacts on the unoperated secondary off-normal contacts 71, break contacts 821 on unoperated relay 820, and through the winding of the secondary magnet M62 to battery. The switch is now stepped one step in its secondary direction in response to the operation of magnet M62. At contacts 732, the release of relay 730 opens the energizing circuit for transfer relay 720. After a short interval of time, relay 720 releases and at its contacts 721, opens the previously described operating circuit for magnet M62 to release said magnet. The wipers of the automatic routine apparatus, TT, TR, TS, and THS, are now positioned so as to connect with the terminal bank terminals T, R, S, and HS, respectively, of line circuit 11, shown in Fig. 1.

A first group of predetermined fault tests is now made on the conductors of line circuit 11. Tip relay 420 tests the tip conductor for an open condition over a circuit extending from battery through the two windings of relay 420 in series, break contacts 31*d* of connector key K31, break contacts 211 on unoperated relay 210, break contacts 201 on unoperated relay 200, the test tip wiper TT, the tip terminal T of the finder banks, and through break contacts 101 on unoperated relay 100 to ground. If this circuit is complete, tip relay 420 operates. Ring relay 430 performs a similar test on the ring conductor over a circuit extending from ground through the two windings of relay 430 in series, through break contacts 31*g* on connector key K31, break contacts 212 on unoperated relay 210, break contacts 202 on unoperated relay 200, the test ring wiper TR, the ring terminal R in the finder banks, break contacts 102 on unoperated relay 100, and through the winding of line relay 110 to battery. The resistance of the two windings of relay 430 is sufficiently high to prevent the operation of line relay 110. Ring relay 430 operates in series with relay 110 to signify to the automatic routine apparatus that the ring conductor is not open. Ground on break contacts 31*b* of key K31 is now connected through to operated make contacts 432 on relay 430, break contacts 454 on unoperated relay 450, and through the winding of finder delay relay 630 to battery. Relay 630 operates in this circuit but performs no function at this time.

Sleeve potential relay 410 is connected through break contacts 352 on unoperated relay 450, break contacts 31*j* on key K31, break contacts 213 on unoperated relay 210, break contacts 203 on unoperated relay 200, the test sleeve wiper TS, the sleeve terminal S in the finder banks to open contacts on relays 100 and 110 in line circuit 11. Differentially connected relay 410 is designed to operate from a stray battery or ground potential connected through a resistance of 10,000 ohms or less to the sleeve terminal. Since the HS terminal of line circuit 11 is not terminated by resistance ground, relay 300 will operate at this time but has no effect on circuit operations. Relay 300 operates from ground through operated contacts 22*k* on key K22 through its lower winding, operated contacts 22*h* on key K22, break contacts 214*a* on unoperated relay 210, and through operated make contacts 22*c* on key K22 to battery.

Means is provided for causing a line finder to connect with the terminals under test responsive to the successful completion of the first group of fault tests as marked by the operated condition of tip relay 420, ring relay 430, and the unoperated condition of the sleeve potential relay 410. Ground through break contacts 412 of relay 410 is connected through operated make contacts 422 on relay 420, operated make contacts 431 on relay 430, and through the winding of switch through relay 450 to battery. At contacts 454, relay 450 opens the previously described operating circuit for finder delay relay 630. The resistance capacitance network comprising resistor R61 and capacitor C61 in parallel with the winding of relay 630, serves to give this relay sufficient release time to cover the finding time of a line finder switch. Ground on contacts 31*f* of key K31 is connected through break contacts 602 of unoperated relay 600, operated make contacts 455 of relay 450, and through the winding of the advance control relay 510 to battery to operate said relay.

Line relay 110 in line circuit 11 is now operated over a circuit extending from ground through resistor R52, operated make contacts 531 on relay 630, break contacts 501 on unoperated relay 600, break contacts 472 on unoperated relay 370, operated make contacts 451 on relay 450, through the upper winding of relay 430 and over the previously described ring conductor circuit and through the winding of line relay 110 to battery. Resistance R52 is chosen to be of the same order of resistance as the maximum loop requirements in the automatic telephone system. It thus checks the operate current of the line relay.

At its operated contacts 114, relay 110 connects ground to the allotter start lead to initiate the operation of line finder allotter 50. Line finder allotter 50 serves to connect ground to the start conductor of a preselected line finder, assumed to be line finder 20, to operate the start relay 130 in that line finder. At its operated contacts 131, relay 130 connects resistor R11 across the tip and ring conductors leading to the associated selector circuit 30. Relays 140 and 150 in selector 30 are thus operated. Operated relay 130 also serves to connect the operating magnets of line finder 20, not shown, to control leads from allotter 50 to first drive the switch in its primary direction and then in its secondary direction to seize the marked line terminals. The finder switch is stopped in its secondary advancement by battery potential connected through the winding of cut-off relay 100 through operated make contacts 113 on relay 110, the sleeve terminal S in the finder banks, the finder sleeve wiper FS, break contacts 124 on unoperated relay 120, and over the secondary stop conductor to line finder allotter 50. In response to this ground connection to the secondary stop conductor, line finder allotter 50 serves to connect ground to the switch through conductor leading to switch through relay 120 in line finder 20 to operate relay 120. The allotter also functions to remove ground from the start conductor to release relay 130 and thus remove the resistance bridge from across the conductors leading to the calling bridge relay 140 in selector 30. At its operated contacts 121, 122, 123, and 125, switch through relay 120 connects the talking and control conductors of the selector circuit 30 to the finder wipers FT, FR, FS, and FHS, respectively, and thus to the terminal set comprising terminals T, R, S, and HS associated with line circuit 11 in the finder banks. Ground returned over the sleeve conductor from the selector circuit 30 at operated contacts 151 of relay 150, through operated contacts 123 on relay 120, wiper FS, terminal S, operated contacts 113 of relay 110, is connected through the winding of cut-off relay 100 to operate said relay. At its operated preliminary make contacts 103, relay 100 locks to this sleeve ground and at its break contacts 101 and 102, removes ground and the winding of the line relay from the T and R terminals, respectively. Relay 110 now releases to remove ground from the allotter start conductor. Line finder allotter 50 now preselects the next idle line finder in a group for use in the well known manner.

Means is provided for performing a second group of predetermined fault tests on the line finder responsive to the connection of the line finder to the terminals of line circuit 11. Sleeve relay 600 checks for ground potential on the selector sleeve conductor over a circuit extending from battery through the winding of relay 600, operated make contacts 353 on relay 450, break contacts 31*j* on key K31, break contacts 213 on unoperated relay 210, break contacts 203 on unoperated relay 200, and through the test sleeve wiper TS to the sleeve terminal S in the finder banks. The operation of relay 600 serves to indicate to the automatic routine apparatus that the required sleeve ground is present. It might be mentioned at this time that previous to the operation of relay 600 the calling bridge relay 140 in selector 30 was held operated from ground through resistor R52, break contacts 501 on unoperated relay 600, and over the previously described ring circuit to the lower winding of relay 140 and battery through resistor R53 was connected through break contacts 503 on relay 600 over the previously described tip circuit and through the upper winding of relay 140 to ground.

The operation of relay 600 serves to shift from this holding circuit for relay 140 to a circuit including ground through the upper winding of relay 810, resistor R54, the winding of relay 550, operated make contacts 502 on relay 600, and over the previously described ring circuit to the lower winding of relay 140 and battery through the lower winding of relay 810, resistor R71, the winding of relay 700, operated make contacts 504 on relay 600, and over the previously described tip circuit and through the upper winding of relay 140 to ground. Relays 420 and 430 check the talking conductors for a battery reversal. If the ring conductor, for example, should be connected to ground in selector 30 rather than to battery, relay 430 would have its windings shunted and would thus release. Current ring relay 550 checks the excessive current in the ring conductor as might be caused by two ring conductors crossed, and current tip relay 700 makes a similar test on the tip conductor. Unbalance relay 810 serves to check the talking conductors for an unbalanced condition, as its name implies. Differentially connected relay 300 serves to check the HS control conductor for stray potentials. This relay will operate over its lower winding, as previously described, if the resistance ground connection on conductor HS is not present in selector 30.

Means is provided for automatically stepping the automatic routine apparatus switch to the next terminal responsive to the successful completion of the second group of predetermined fault tests as marked by the unoperated condition of relays 810, 700, 550, 300, and the operated condition of sleeve relay 600. If the tests have been successfully completed when slow release relay 510 releases, advance relay 210 operates over a circuit extending from ground on break contacts 812 on unoperated relay 810, through break contacts 702 on unoperated relay 700, break contacts 651 on unoperated relay 550, break contacts 462 on unoperated relay 360, break contacts 402 on unoperated relay 300, operated make contacts 603 on relay 600, break contacts 611 on unoperated relay 510, break contacts 24*c* on unoperated key K24, and through the upper winding of relay 210 to battery. At its break contacts 211, 212, 213 and 215, relay 210 opens the circuit connection to the automatic routine apparatus wipers. The opening of break contacts 212 and 213 serves to release calling bridge relay 140 in selector 30. At contacts 141, relay 140 releases relay 150. At contacts 151, relay 150 removes ground from the sleeve conductor to release cut-off relay 100 and line finder 20 in the well known manner. In the automatic routine apparatus, the operation of make contacts 219 on relay 210 closes an operating circuit for the secondary magnet M62. The circuit extends from ground on break contacts 825 of unoperated relay 820, through operated make contacts 219 on relay 210, break contacts 23*c* on key K23, break contacts 711 on unoperated relay 710, and through the winding of magnet M62 to battery. The operation of magnet M62 serves to advance the switch one step in its secondary direction. Ground is also connected through break contacts 23*b* on key K23 and through operated make contacts 216 on relay 210 and through the winding of secondary step relay 710 to battery. Slow operate relay 710 operates to open the previously described operating circuit for magnet M62 at its break contacts 711.

At break contacts 712, relay 710 opens the holding path for the advance relay 210 which now releases. The release of relay 210 serves to connect the automatic routine apparatus to the test wipers and thus to the set of terminals in the finder banks associated with line circuit 12. At contacts 216, relay 210 opens the previously described operating circuit to relay 710 to release said relay.

The previously described tests are now repeated on terminals 12 of the finder banks. The automatic routine tester will continue to test the terminals in the first level in succession until the overflow position is reached in the secondary direction. When the switch overflow contacts operate, secondary overflow relay 800 operates over a circuit extending from ground on break contacts 825 of unoperated relay 820, through break contacts 219*a* on unoperated relay 210, operated overflow springs OF81, and through the winding of relay 800 to battery. At its preliminary make contacts 804, relay 800 closes ground through resistor R82 to the winding of primary magnet M61. At its make contacts 801, relay 800 locks operated to ground through break contacts 731 on relay 730. Ground through operated secondary off-normal contacts 82 is now connected through operated make contacts 803 on relay 800, through the primary off-normal contacts 41, or the secondary off-normal contacts 42, and through the winding of release magnet M63 to battery. The energization of release magnet M63 causes the switch to restore in its secondary direction. The switch is prevented from releasing in its primary direction because of the partial energization of primary magnet M61 through resistor R82. When the secondary off-normal contacts 82 transfer from the operated to the non-operated position, the release magnet M63 is deenergized and the ground is routed through the break portion of secondary off-normal contacts 82, through operated make contacts 802 on relay 800, and through the winding of primary step relay 730 to battery. Relay 720 operates from ground on operated contacts 732 on relay 730. At break contacts 731, relay 730 opens the holding circuit for slow-release relay 800 which releases after a short interval. Ground is now connected through operated make contacts 733 on operated relay 730, break contacts on the release off-normal pile-up 72, and through magnet M61 to battery to position the switch before the next level of finder bank terminals. Relay 730 releases responsive to the release of relay 800 and at contacts 733 opens the previously described circuit for magnet M61. Ground is now closed through break contacts 734 on relay 730 through still operated contacts 721 on relay 720, secondary off-normal contacts 71, break contacts 821 on relay 820, and through the winding of the secondary magnet M62 to step the wipers one step in the secondary direction. Relay 720, which was deenergized when relay 730 released, finally releases to open the operating circuit for magnet M61.

The automatic routine apparatus now tests all terminals in the second level and when secondary overflow position is again reached, the switch wipers are positioned before level three and tests are repeated in that level. This operation continues until the switch is driven to the overflow position in the primary direction. At that time, test end relay 820 is energized over a circuit extending from ground through operated contacts on the overflow 83 springs, through break contacts of secondary off-normal pile-up 84, and through the winding of relay 820 to battery. At contacts 823, relay 820 connects ground to the winding of buzzer B81 to energize said buzzer. The sounding of the buzzer informs the installer that the tests have been completed in the finder bank multiple.

Assume that the automatic routine apparatus finds a fault in a line circuit during the first group of predetermined fault tests. For example, assume that sleeve potential relay 410 operates from a stray potential on the sleeve conductor. At its operated contacts 411, relay 410 connects ground through sleeve potential lamp L41 to the B battery supply. The lamp battery B is connected through break contacts 822 on unoperated relay 820 and through the winding of lamp relay 830 to battery. Thus, relay 830 operates in series with the lamp L41. At break contacts 831, relay 830 opens the energizing circuit of normally operated alarm relay 840. The release of this relay is delayed by the discharge time of the capacitor resistor network comprising C81 and R81 connected in parallel with its winding. When relay 840 releases, ground is connected through its break contacts 841 to energize the buzzer. Thus, the operator is given an audible indication that the automatic routine apparatus has been arrested in its operation. Lamp L41 is illuminated to inform the operator that the particular fault found was a stray potential on the sleeve conductor.

Means is provided for arresting the operation of the automatic routine apparatus since switch through relay 450 cannot operate because of the opening of break contacts 412 by operated relay 410.

Assume that the automatic routine apparatus finds a fault in a line finder during the second group of predetermined fault tests. Assume that current ring relay 550 is operated by excessive current in the ring conductor. At operated contacts 551, relay 550 closes ground to lamp L53 and to lamp relay 830, as previously described. The operation of relay 830 and the subsequent release of alarm relay 840 serves to energize the buzzer.

The operation of the automatic routine apparatus is arrested since the operating circuit for the advance relay 210 is opened at break contacts 651 on the operated current ring relay 550.

Assume that the operator wishes to retest the faulty set of terminals. The operator depresses the non-locking retest key K24. At operated contacts 24*a* on key K24, ground is connected to the winding of release relay 200 to operate said relay. At operated contacts 201, 202, 203 and 204, relay 200 disconnects the test wipers from the automatic routine apparatus to thereby release the circuits under test and any operated relays in the automatic routine apparatus. The advance relay 210 is prevented from operating by the open break contacts 24*c* on key K24. When the key K24 is restored, the automatic routine apparatus is again connected to the test wipers and performs the same test in the same manner as before.

Assume that the operation of the automatic routine apparatus is arrested upon the retest of the terminals. The operator may advance the automatic routine apparatus to the next set of terminals so that tests can continue while he is clearing the trouble found on the previously tested terminals. The operator operates the advance key K23 to initiate this action. Ground through operated make contacts 23*a* on key K23 is connected through the upper winding of relay 210 to operate said relay. At contacts 211, 212, 213 and 215, relay 210 disconecets the automatic routine apparatus from the test wipers to release the circuits under test and all operated relays in the automatic routine apparatus except relay 210. When the advance key is restored, the previously described circuits for operating the secondary magnet M62 and the secondary step relay 710 are completed to advance the wipers of the automatic routine apparatus into engagement with the next set of terminals.

It is to be noted that the automatic routine apparatus has an HS open key K21 and an HS selector key K22. In the above detailed description of the finder bank multiple test, it was assumed that key K22 was operated since the HS conductor in selector 30 is connected to resistance ground. It might be well to mention at this time the different uses of these HS keys for testing selectors which are not so terminated. If the HS conductor, in the selector circuits to be tested, is terminated in resistance battery, as may be the case in restricted service systems, the HS open key K21 is operated during these tests to disconnect relay 300 from the test wiper THS. If the HS conductor is not terminated in the selector, both keys K21 and K22 are left in their unoperated condition. Under this condition, relay 300 will operate if there is a stray ground potential on the HS conductor. A stray ground potential on the HS conductor would be indicative of a cross between the sleeve and hunt sleeve conductors.

*Selector banks multiple testing*

The testing of selector bank multiples is identical to finder bank multiple testing. The operation of the start key K71 positions the switch on terminal 11 of the selector banks. Hight resistance relays 420 and 430 test the tip and ring conductors T1 and R1 for continuity. If a calling bridge relay, such as 160 in connector 40, is connected to the tip and ring conductors, relays 420 and 430 operate, as previously described. Calling bridge relay 160 does not operate in series with relays 420 and 430. Sleeve potential relay 410 is connected through the test sleeve wiper TS to terminal S1 in the selector banks and tests the sleeve conductor for stray potentials. As previously mentioned, relay 410 operates from either battery or ground through a resistance of less than 10,000 ohms. The HS conductor is tested by hunt sleeve relay 300 in the manner previously described.

Responsive to the successful completion of this first group of predetermined fault tests, switch through relay 450 and finder delay relay 630 operate, as previously described. Calling bridge relay 160 in connector 40 now operates in series with resistors R52 and R53, as previously described. Release delay relay 170 in connector 40 now operates through operated contacts 161 on relay 160 and at its contacts 171, closes ground to the sleeve terminal S1. Sleeve relay 600 operates from this ground connection to the sleeve terminal and at its contacts 502 and 504, inserts relays 550, 700 and 810 into the loop circuit for the purpose of performing the second group of predetermined fault tests. As previously described, relays 420 and 430 test the line for battery reversals, relays 550 and 700 test the talking conductors for excessive current, and relay 810 tests the talking conductors for an unbalanced condition. When relay 510 releases after a predetermined time interval, a circuit is closed to operate the advance relay 210 and thus step the switch to the next set of terminals, all as previously described. The tests continue until all 100 terminals have been tested at which time the test end relay 820 operates to energize buzzer B81 for the purpose of informing the operator that the testing has been completed.

*Connector banks multiple testing*

Preparatory to making tests upon the connector bank multiple, the switch associated with the automatic routine apparatus is plugged into a spare switch cell having access to the connector bank multiple and connector key K31 is operated. To initiate the test, the operator depresses and releases the start key K71 and the switch steps to terminal 11, as previously described.

The connector sleeve relay 340 now operates over a circuit extending from ground through its upper winding, break contacts 341 on unoperated relay 340, operated make contacts 31*k* on key K31, break contacts 213 on unoperated relay 210, break contacts 203 on unoperated relay 200, the test sleeve wiper TS, the connector banks sleeve terminal SN, break contacts 112 on unoperated relay 110 in line circuit 11, and through the winding of the cut-off relay 100 to battery. Relay 100 does not operate in series with the high resistance winding of relay 340. At its operated contacts 343, relay 340 closes an obvious holding circuit to its lower winding. At operated make contacts 344, relay 340 now closes an operating ground to the slow operate assist relay 370. At its operated make contacts 345, relay 340 closes an operating circuit for the advance control relay 510 through break contacts 373 of relay 370 for the operate time of relay 370. As previously described, the advance control relay 510 is very slow in releasing because of the resistor capacitor network in parallel with its winding.

The connector sleeve test relay 360 is now connected through resistor R31 and operated make contacts 517 of relay 510, operated make contacts 342 on relay 340 and over the previously described sleeve circuit to the winding of the cut-off relay 100. The cut-off relay 100 operates in this low resistance circuit. Relay 360 operates only if there is excessive current in the sleeve conductor as might happen when two cut-off relays are connected in parallel. If relay 360 should operate, it will close a locking circuit for the advance control relay 510 through its operated contacts 361 and through operated make contacts 516 on relay 510. At its operated make contacts 461, relay 360 closes a circuit for lamp L81 and lamp relay 830 in series. Relay 830 then operates to release alarm relay 840, all as previously described.

The differentially connected connector tip relay 540 is connected through operated make contacts 515 on relay 510, operated make contacts 372 on relay 370, operated make contacts 31*c* on key K31, break contacts 211 on unoperated relay 210, break contacts 201 on unoperated relay 200, the test tip wiper TT to the tip terminal T in connector banks. Relay 540 checks for stray potentials on the tip conductor extending to the line circuit. This relay is designed to operate on either battery or ground potential through less than 10,000 ohms resistance. Simultaneously with the above, the connector ring relay 520 is connected through operated make contacts 513 on relay 510, operated make contacts 371 on relay 370, operated make contacts 31*h* on key K31, break contacts 212 on unoperated relay 210, break contacts 202 on unoperated relay 200, the test ring conductor TR to the ring terminal R in the connector banks. Relay 520 checks the ring conductor for stray potentials. It can be seen that if either relay 520 or relay 540 operates, a holding circuit will be closed for the advance control relay 510 through either operated make contacts 522 or 542, respectively. Also, either lamp L51 or L52 will be illuminated to indicate a ring potential or a tip potential, respectively.

If the first group of predetermined fault tests is successful as marked by the unoperated condition of relays 360, 520 and 540, the advance control relay 510 will release after the capacitor C51 discharges sufficiently. When relay 510 releases, the low resistance winding of relay 360 is disconnected from the sleeve conductor at contacts 517 on relay 510. Sleeve relay 600 is then connected through break contacts 518 on relay 510 to the previously described sleeve circuit. Cut-off relay 100 in line circuit 11 thus releases in response to the disconnection of ground connected sleeve relay 360 from the sleeve conductor.

The battery connected high resistance tip relay 420 is now connected through break contacts 514 on unoperated relay 510 to the previously described tip circuit which extends to terminal T in the connector banks. Ground on break contacts 101 of unoperated relay 100 operates relay 420 over this circuit. The ground connected high resistance ring relay 430 is now connected through break contacts 512 on unoperated relay 510 and over the previously described ring circuit to the ring terminal R in the connector banks and through break contacts 102 on unoperated relay 100 to the winding of the line relay 110. Relay 430 operates in this circuit but the line relay 110 does not.

Switch through relay 450 now operates if the tip and ring continuity tests are successful as marked by the operated condition of relays 420 and 430, respectively. The operating circuit for relay 450 extends from ground through break contacts 412 on unoperated relay 410, make contacts 422 on relay 420, operated make contacts 431 on relay 430, and through the winding of relay 450 to battery. The line relay 110 of line circuit 11 is now operated over a circuit extending from ground through resistor R52, operated make contacts 471 on relay 370, operated make contacts 451 on relay 450, the upper winding of ring relay 430 and over the previously described ring conductor to the winding of line relay 110.

At its operated contacts 114, relay 110 closes ground to the allotter start conductor to cause a line finder, such as line finder 20, to find the finder bank terminals of line 11, as previously described. When the line finding operation is complete, ground on operated make contacts 151 of relay 150 is connected through operated make contacts 123 on finder switch through relay 120, the finder sleeve wiper FS, the finder bank sleeve terminal S, operated make contacts 113 on relay 110, and through the winding of cut-off relay 100 to battery, to operate relay 100. Relay 100 locks operated to the sleeve ground through its preliminary make contacts 103 and at its break contacts 101 and 102, disconnects ground and the winding of the line relay from the talking conductors. Upon subsequent release of relay 110, the sleeve ground is also connected through break contacts 112 on unoperated relay 110 to the SN terminal in the connector banks and over the previously described sleeve circuit to operate sleeve relay 600. The sleeve relay 600 thus checks the sleeve conductor to make certain that the connector banks SN terminal is marked busy when a call is initiated at line circuit 11. If relay 600 should fail to operate, ground is connected through its break contacts 601, operated make contacts 453 on relay 450, sleeve open lamp L43, and through the winding of lamp relay 820 to battery. Thus an alarm would be sounded and the particular fault found would be indicated.

If the test is successful as marked by the operation of sleeve relay 600, the previously described operating circuit for advance relay 210 is closed at operated make contacts 603 on relay 600. Responsive to the operation of relay 210, the switch is stepped to terminal 12 and the tests are repeated.

The tests continue until all 100 terminals have been tested at which time the buzzer B81 is energized to inform the operator that the tests are complete, all as previously described.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a telephone system, a line circuit, a line finder operative to connect with said line circuit, automatic routine apparatus, means for connecting said automatic routine apparatus to said line circuit, means in said automatic routine apparatus for testing said line circuit, means in said automatic routine apparatus for thereafter causing said line finder to connect with said line circuit, and means in said automatic routine apparatus for thereafter testing said line finder.

2. In a telephone system, a line circuit, a line finder operative to connect with said line circuit, automatic routine apparatus, means for connecting said automatic routine apparatus to said line circuit, means in said automatic routine apparatus for performing a first group of predetermined fault tests upon said line circuit, means in said automatic routine apparatus responsive to the successful completion of said first group of predetermined fault tests for causing said line finder to connect with said line circuit, means in said automatic routine apparatus responsive to the connection of said line finder with said line circuit for performing a second group of predetermined fault tests upon said line finder.

3. In a telephone system, a line circuit, a line finder operative to connect with said line circuit, automatic routine apparatus, means for connecting said automatic routine apparatus to said line circuit, means in said automatic routine apparatus for performing a first group of predetermined fault tests upon said line circuit, means in said automatic routine apparatus responsive to the finding of a fault in said line circuit for arresting operation of said automatic routine apparatus, means in said automatic routine apparatus responsive to the successful completion of said first group of predetermined fault tests for causing said line finder to connect with said line circuit, means in said automatic routine apparatus responsive to the connection of said line finder with said line circuit for performing a second group of predetermined fault tests upon said line finder, means in said automatic routine apparatus responsive to the finding of a fault in said line finder for arresting operation of said automatic routine apparatus, and means for indicating the particular fault found by said automatic routine apparatus.

4. In a telephone system, a line circuit terminating in a set of terminals, a line finder operative to connect with said set of terminals, automatic routine apparatus, means for connecting said automatic routine apparatus to said set of terminals, means in said automatic routine apparatus for testing said line circuit, means in said automatic routine apparatus for thereafter causing said line finder to connect with said set of terminals, and means in said automatic routine apparatus for thereafter testing said line finder.

5. In a telephone system, a line circuit terminating in a set of terminals, a line finder operative to connect with said set of terminals, automatic routine apparatus, means for connecting said automatic routine apparatus to said set of terminals, means in said automatic routine apparatus for performing a first group of predetermined fault tests upon said line circuit, means in said automatic routine apparatus responsive to the successful completion of said first group of predetermined fault tests for causing said line finder to connect with said set of terminals, and means in said automatic routine apparatus responsive to the connection of said line finder to said set of terminals for performing a second group of predetermined fault tests upon said line finder.

6. In a telephone system, a line circuit terminating in a set of terminals, a line finder operative to connect with said set of terminals, automatic routine apparatus, means for connecting said automatic routine apparatus to said set of terminals, means in said automatic routine apparatus for performing a first group of predetermined fault tests upon said line circuit, means in said automatic routine apparatus responsive to the finding of a fault in said line circuit for arresting operation of said automatic routine apparatus, means in said automatic routine apparatus responsive to the successful completion of said first group of predetermined fault tests for causing said line finder to connect with said set of terminals, means in said automatic routine apparatus responsive to the connection of said line finder to said set of terminals for performing a second group of predetermined fault tests upon said line finder, means in said automatic routine apparatus responsive to the finding of a fault in said line finder for arresting operation of said automatic routine apparatus, and means for indicating the particular fault found by said automatic routine apparatus.

7. In a telephone system, a group of line circuits terminating in individual sets of terminals, a line finder operative to selectively connect with the individual sets of terminals, means for testing a selected one of said line circuits, means responsive to the successful completion of the testing of said one line circuit for causing said line finder to connect with the individual set of terminals associated with said one line circuit, means responsive to the connection of said line finder with said individual set of terminals associated with said one line circuit for testing said line finder, and means operative to control said first, second, and third means to sequentially test said plurality of line circuits and said line finder while connected with each of said individual sets of terminals.

8. In a telephone system, a group of line circuits terminating in individual sets of terminals, a line finder operative to selectively connect with the individual sets of terminals, automatic routine apparatus, means for connecting said automatic routine apparatus to a first of said individual sets of terminals, means in said automatic routine apparatus for testing the line circuit associated with said first set of terminals, means in said automatic routine apparatus for thereafter causing said line finder to connect with said first set of terminals, means in said automatic routine apparatus for testing said line finder, means thereafter effective for automatically connecting said automatic routine apparatus to a second set of said individual sets of terminals, thereby to perform a test upon the line circuit associated with said second set of terminals and a test upon said line finder while connected with said second set of terminals.

9. In a telephone system, a group of line circuits terminating in individual sets of terminals, a line finder operative to selectively connect with the individual sets of terminals, automatic routine apparatus, means for connecting said automatic routine apparatus to a first of said individual sets of terminals, means in said automatic routine apparatus for performing a first group of predetermined fault tests upon the line circuit associated with said first set of terminals, means in said automatic routine apparatus responsive to the successful completion of said first group of predetermined fault tests for causing said line finder to connect with said first set of terminals, means in said automatic routine apparatus responsive to the connection of said line finder to said first set of terminals for performing a second group of predetermined fault tests upon said line finder, and means responsive to the successful completion of said second group of fault tests for automatically connecting said automatic routine apparatus to a second set of said individual sets of terminals, thereby to perform said first group of predetermined fault tests upon the line circuit associated with said second set of terminals and said second group of predetermined fault tests upon said line finder while connected with said second set of terminals.

10. In a telephone system, a group of line circuits terminating in individual sets of terminals, a line finder operative to selectively connect with the individual sets of terminals, automatic routine apparatus, means for connecting said automatic routine apparatus to a first of said individual sets of terminals, means in said automatic routine apparatus for performing a first group of predetermined fault tests upon the line circuit associated with said first set of terminals, means in said automatic routine apparatus responsive to the successful completion of said first group of predetermined fault tests for causing said line finder to connect with said first set of terminals, means in said automatic routine apparatus responsive to the connection of said line finder to said first set of terminals for performing a second group of predetermined fault tests upon said line finder, means responsive to the successful completion of said second group of fault tests for automatically connecting said automatic routine apparatus to a second set of said individual sets of terminals, thereby to perform said first group of predetermined fault tests upon the line circuit associated with said second set of terminals and said second group of predetermined fault tests upon said line finder while connected with said second set of terminals, means in said automatic routine apparatus responsive to the finding of a fault in a line circuit for arresting operation of said automatic routine apparatus, means in said automatic routine apparatus responsive to the finding of a fault in said line finder for arresting operation of said automatic routine apparatus, and means for indicating the particular fault found by said automatic routine apparatus.

11. In a telephone system, a group of line circuits terminating in individual sets of terminals, a group of line finders, each of said line finders being operative to selectively connect with the individual sets of terminals, means for assigning said line finders in rotative order for connection with said sets of terminals, automatic routine apparatus, means for connecting said automatic routine apparatus to a first of said individual sets of terminals, means in said automatic routine apparatus for testing the line circuit associated with said first set of terminals, means in said automatic routine apparatus for thereafter initiating the operation of said line finder assigning means to cause a line finder to connect with said first set of terminals, means in said automatic routine apparatus for testing said line finder, means thereafter effective for automatically connecting said automatic routine apparatus to a second set of said individual sets of terminals, thereby to perform a test upon the line circuit associated with said second set of terminals and a test upon the next assigned line finder.

12. In a telephone system, a group of line circuits terminating in individual sets of terminals, a group of line finders, each of said line finders being operative to selectively connect with the individual sets of terminals, means for assigning said line finders in rotative order for connection with said sets of terminals, automatic routine apparatus, means for connecting said automatic routine apparatus to a first of said individual sets of terminals, means in said automatic routine apparatus for performing a first group of predetermined fault tests upon the line circuit associated with said first set of terminals, means in said automatic routine apparatus responsive to the successful completion of said first group of predetermined fault tests for initiating the operation of said line finder assigning means to cause a line finder to connect with said first set of terminals, means in said automatic routine apparatus responsive to the connection of said line finder to said first set of terminals for performing a second group of predetermined fault tests upon said line finder, and means responsive to the successful completion of said second group of fault tests for automatically connecting said automatic routine apparatus to a second set of said individual sets of terminals, thereby to perform said first group of predetermined fault tests upon the line circuit associated with said second set of terminals and said second group of predetermined fault tests upon the next assigned line finder.

13. In a telephone system, a group of line circuits terminating in individual sets of terminals, a group of line finders, each of said line finders being operative to selectively connect with the individual sets of terminals, means for assigning said line finders in rotative order for connection with said sets of terminals, automatic routine apparatus, means for connecting said automatic routine apparatus to a first of said individual sets of terminals, means in said automatic routine apparatus for performing a first group of predetermined fault tests upon the line circuit associated with said first set of terminals, means in said automatic routine apparatus responsive to the successful completion of said first group of predetermined fault tests for initiating the operation of said line finder assigning means to cause a line finder to connect with said first set of terminals, means in said automatic routine apparatus responsive to the connection of said line finder to said first set of terminals for performing a second proup of predetermined fault tests upon said line finder, means responsive to the successful completion of said second group of predetermined fault tests for automatically connecting said automatic routine apparatus with a second set of said individual sets of terminals, thereby to perform said first set of predetermined fault tests upon the line circuit associated with said second set of terminals and said second group of predetermined fault tests upon the next assigned line finder, means in said automatic routine apparatus responsive to the finding of a fault in a line circuit for arresting operation of said automatic routine apparatus, means in said automatic routine apparatus responsive to the finding of a fault in a line finder for arresting operation of said automatic routine apparatus, and means for indicating the particular fault found by said automatic routine apparatus.

14. Automatic routine apparatus for use in a telephone system, said telephone system comprising a group of line circuits terminating in individual sets of terminals in a line finder bank, a group of line finders, each of said line finders having wipers adapted to selectively engage the individual sets of terminals in the finder bank, and a line finder allotter for assigning the line finders for use in rotative torder; said automatic routine apparatus also having wipers adapted to selectively engage the individual sets of terminals in the finder bank, means for positioning the wipers of said automatic routine apparatus on a first set of terminals in said finder bank, means in said automatic routine apparatus for performing a first group of predetermined fault tests upon the line circuit associated with said first set of terminals, means responsive to the successful completion of said first group of predetermined fault tests for initiating the operation of said line finder allotter to cause the wipers of a line finder to engage said first set of terminals in the line finder bank, means in said automatic routine apparatus responsive to the connection of the wipers of the line finder to said first set of terminals for performing a second group of predetermined fault tests upon the line finder, and means responsive to the successful completion of said second group of fault tests for releasing the line finder and for automatically stepping the wipers of said automatic routine apparatus into engagement with the next succeeding set of terminals in said finder banks, thereby to perform said first group of predetermined fault tests upon the line circuit associated with said next succeeding set of terminals and the second group of predetermined fault tests upon the next assigned line finder.

15. Automatic routine apparatus for use in a telephone system, said telephone system comprising a group of line circuits terminating in individual sets of terminals in a line finder bank, a group of line finders, each of said line finders having wipers adapted to selectively engage the individual sets of terminals in the finder bank, and a line finder allotter for assigning the line finders for use in rotative order; said automatic routine apparatus also having wipers adapted to selectively engage the individual sets of terminals in the finder bank, means for positioning the wipers of said automatic routine apparatus on a first set of terminals in said finder bank, remains in said automatic routine apparatus for performing a first group of predetermined fault tests upon the line circuit associated with said first set of terminals, means responsive to the successful completion of said first group of predetermined fault tests for initiating the operation of said line finder allotter to cause the wipers of a line finder to engage said first set of terminals in the line finder bank, means in said automatic routine apparatus responsive to the connection of the wipers of the line finder to said first set of terminals for performing a second group of predetermined fault tests upon the line finder, means responsive to the successful completion of said second group of fault tests for releasing the line finder and for automatically stepping the wipers of said automatic routine apparatus into engagement with the next succeeding set of terminals in said finder banks, thereby to perform said first group of predetermined fault tests upon the line circuit associated with said next succeeding set of terminals and the second group of predetermined fault tests upon the next seized line finder, means in said automatic routine apparatus responsive to the finding of a fault in a line circuit for arresting operation of said automatic routine apparatus, means in said automatic routine apparatus responsive to the finding of a fault in a line finder for arresting operation of said automatic routine apparatus, and means for indicating the particular fault found by said automatic routine apparatus.

16. In a telephone system, a group of line circuits, each of said line circuits having talking and control conductors which terminate in individual sets of contacts in a line finder terminal bank, a group of line finder circuits, each of said line finder circuits having talking and control wipers adapted to selectively engage the individual sets of contacts in said line finder terminal bank, a line finder allotter, said line finder allotter being adapted to assign the line finder circuits for use in rotative order, a group of selector circuits, each of said selector circuits having talking and control conductors connected to an individual one of said line finder circuits, automatic routine apparatus having a set of talking and control wipers, said automatic routine apparatus wipers having access to the individual sets of contacts in said line finder terminal bank, means for positioning the wipers of said automatic routine apparatus on a first set of contacts in said line finder bank, means in said automatic routine apparatus for performing a first group of predetermined fault tests upon the talking and control conductors of the line circuit associated with said first set of contacts, means in said automatic routine apparatus responsive to the successful completion of said first group of predetermined fault tests for initiating the operation of said line finder allotter to cause a line finder in said group of line finders to connect its wipers with said first set of contacts, means in said line finder responsive to the connection of said line finder wipers with said first set of contacts for connecting said talking and control conductors of said selector circuit through said line finder talking and control wipers, respectively, to said first set of contacts, means in said automatic routine apparatus responsive to the connection of said selector conductors to said first set of contacts for performing a second group of predetermined fault tests upon the selector circuit talking and control conductors, means in said automatic routine apparatus responsive to the successful completion of said second group of predetermined fault tests for releasing said first line finder circuit and its associated selector circuit and for automatically stepping the wipers of said automatic routine apparatus into engagement with the next succeeding set of contacts in said finder banks, thereby to perform said first group of predetermined fault tests upon the line circuit associated with said next succeeding set of contacts and the second group of predetermined fault tests upon the talking and control conductors of the next seized selector circuit.

17. In a telephone system, a group of line circuits, each of said line circuits having talking and control conductors which terminate in individual sets of contacts in a line finder terminal bank, a group of line finder circuits, each of said line finder circuits having talking and control wipers adapted to selectively engage the individual sets of contacts in said line finder terminal bank, a line finder allotter, said line finder allotter being adapted to assign the line finder circuits for use in rotative order, a group of selector circuits, each of said selector circuits having talking and control conductors connected to an individual one of said line finder circuits, automatic routine apparatus having a set of talking and control wipers, said automatic routine apparatus wipers having access to the individual sets of contacts in said line finder terminal bank, means for positioning the wipers of said automatic routine apparatus on a first set of contacts in said line finder bank, means in said automatic routine apparatus for performing a first group of predetermined fault tests upon the talking and control conductors of the line circuit associated with said first set of contacts, means in said automatic routine apparatus responsive to the successful completion of said first group of predetermined fault tests for initiating the operation of said line finder allotter to cause a line finder in said group of line finders to connect its wipers with said first set of contacts, means in said line finder responsive to the connection of said line finder wipers with said first set of contacts for connecting said talking and control conductors of said selector circuit through said line finder talking and control wipers, respectively, to said first set of contacts, means in said automatic routine apparatus responsive to the connection of said selector conductors to said first set of contacts for performing a second group of predetermined fault tests upon the selector circuit talking and control conductors, means in said automatic routine apparatus responsive to the successful completion of said second group of predetermined fault tests for releasing said first line finder circuit and its associated selector circuit and for automatically stepping the wipers of said automatic routine apparatus into engagement with the next succeeding set of contacts in said finder banks, thereby to perform said first group of predetermined fault tests upon the line circuit associated with said next succeeding set of contacts and the second group of predetermined fault tests upon the talking and control conductors of the next seized selector circuit, means in said automatic routine apparatus responsive to the finding of a fault on the conductors of a line circuit for arresting the operation of said automatic routine apparatus, means in said automatic routine apparatus responsive to the finding of a fault on the conductors of a selector circuit for arresting the operation of said automatic rountine apparatus, and means for indicating the particular fault found by said automatic routine apparatus.

No references cited.